US009762548B2

(12) United States Patent
Cocotis et al.

(10) Patent No.: US 9,762,548 B2
(45) Date of Patent: Sep. 12, 2017

(54) CONTROLLING ENCRYPTED DATA STORED ON A REMOTE STORAGE DEVICE

(71) Applicant: Western Digital Technologies, Inc., San Jose, CA (US)

(72) Inventors: Thomas Cocotis, Huntington Beach, CA (US); Zvonimir Bandic, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 14/658,129

(22) Filed: Mar. 13, 2015

(65) Prior Publication Data
US 2016/0269367 A1 Sep. 15, 2016

(51) Int. Cl.
H04L 9/32 (2006.01)
H04L 29/06 (2006.01)
H04L 29/08 (2006.01)

(52) U.S. Cl.
CPC ...... *H04L 63/0428* (2013.01); *H04L 67/1097* (2013.01)

(58) Field of Classification Search
CPC ...... G06F 12/14; H04L 9/0825; H04L 9/0891
USPC ...................................................... 713/168
See application file for complete search history.

(56) References Cited

U.S. PATENT DOCUMENTS 8,038,722 B2 10/2011 Ferren et al.
8,556,991 B2 10/2013 Tarkhanyan et al.
2008/0086641 A1* 4/2008 Rodgers ............... H04L 9/0891
713/176
2008/0182667 A1* 7/2008 Davis ..................... G07F 17/32
463/43
2009/0217034 A1* 8/2009 Sudia .................... G06Q 20/02
713/156
2009/0313264 A1* 12/2009 Welingkar ........ G06F 17/30575
2010/0299534 A1 11/2010 Shim et al.
2011/0197069 A9* 8/2011 Rodgers ............... H04L 9/0891
713/176
2011/0252434 A1* 10/2011 Stokes .............. G06F 17/30067
719/318
2011/0283113 A1* 11/2011 Moffat .................. G06F 21/602
713/189
2012/0210126 A1 8/2012 Johnson et al.
(Continued)

OTHER PUBLICATIONS

Dey et al., Addressing Response Time of Cloud-Based Mobile Applications, ACM, Jul. 29, 2013, pp. 3-10.*
(Continued)

*Primary Examiner* — Luu Pham
*Assistant Examiner* — Jenise Jackson
(74) *Attorney, Agent, or Firm* — Patterson & Sheridan, LLP

(57) ABSTRACT

A method, system, and apparatus are provided for controlling encrypted data stored on a remote device. In particular, a remote device includes a storage controller device that can receive a "secure hide" command from an administrator device via a cloud server. If the storage controller device determines the "secure hide" command is validly signed, then the storage controller device executes the secure command by erasing the end user's public decryption key from the storage controller device. At that point, end user access to the encrypted data on the remote device is highly improbable.

13 Claims, 5 Drawing Sheets

(56) References Cited

U.S. PATENT DOCUMENTS

| | | | |
|---|---|---|---|
| 2013/0111598 A1* | 5/2013 | Marcovecchio | H04L 67/34 726/26 |
| 2013/0145160 A1* | 6/2013 | Bursell | G06F 21/6218 713/168 |
| 2013/0185553 A1* | 7/2013 | Robertson | H04L 12/5895 713/158 |
| 2013/0212367 A1 | 8/2013 | Ingalls et al. | |
| 2013/0247222 A1 | 9/2013 | Maksim et al. | |
| 2013/0339715 A1* | 12/2013 | De Atley | H04L 9/0891 713/2 |
| 2014/0068277 A1* | 3/2014 | Metzger | G06F 21/79 713/193 |
| 2014/0079221 A1 | 3/2014 | McCallum et al. | |
| 2014/0344571 A1* | 11/2014 | Adam | G06F 21/6218 713/165 |
| 2014/0380045 A1* | 12/2014 | Brown | H04L 63/0442 713/164 |
| 2015/0006911 A1* | 1/2015 | Cochran | G06F 21/604 713/193 |
| 2015/0248250 A1* | 9/2015 | Han | G06F 3/0619 711/103 |
| 2015/0304108 A1* | 10/2015 | Obukhov | G06F 21/6209 713/193 |
| 2015/0312754 A1* | 10/2015 | Brown | G06F 21/305 455/411 |
| 2015/0339495 A1* | 11/2015 | Brown | G06F 21/6218 726/30 |
| 2016/0011990 A1* | 1/2016 | Berengoltz | G06F 21/6218 711/152 |
| 2016/0013945 A1* | 1/2016 | Offenberg | G06F 21/64 713/176 |
| 2016/0085955 A1* | 3/2016 | Lerner | G06F 21/31 726/20 |
| 2016/0094526 A1* | 3/2016 | Shaw | G06F 21/305 713/154 |

OTHER PUBLICATIONS

Mammasset et al, Implementation of Smart Card Personalization Software, IEEE, 2010, pp. 1-7.*
Hewlett-Packard Development Company, Data Sheet HP 3PAR StoreServ Data-at-Rest Encryption, Aug. 2014, 4 Pages.
Bit TiTan, How It Works—BitTiTan Data Encryption, Oct. 17, 2014, 4 Pages.

* cited by examiner example data packet 600

| header 602 | periodic token T*n* | signed "secure hide" command 604 |

FIG. 6 method 700 remote device 140

702 Receive "secure unhide" command that may be signed with private administrator encryption key (ITSK1, ITMK1, or OK1)

704 Confirm the administrator is authorized to issue the "secure unhide" command by checking administrator's signature by using public administrator decryption key (ITSK2, ITMK2, or OK2)

706 If the administrator is authorized, then generate a new user encryption/decryption key pair (UK1 and UK2), and provide the new user encryption key UK1 to the administrator for distribution to new end user

FIG. 7

CONTROLLING ENCRYPTED DATA STORED ON A REMOTE STORAGE DEVICE

FIELD

The embodiments of the invention relate generally to controlling encrypted data stored on a remote device.

BACKGROUND

An entity (e.g., corporation or person) often has important information stored on a remote device (e.g., laptop computer) that the entity owns. For example, an employee typically stores corporate information on a remote device. Likewise, a person often stores important information on their personal remote device (e.g., personal laptop).

As more and more information is stored on remote devices, it is increasingly important for corporations or persons to protect the data stored on the remote devices. Unfortunately, the nature of storing important information on a remote device is that an entity (e.g., corporation or person) forfeits some control over the information stored on the remote device.

BRIEF SUMMARY

The embodiments are summarized by the claims that follow below. However, briefly, a method, system, and apparatus for controlling encrypted data stored on a remote device are described. In particular, a remote device includes a controller that can receive a "secure hide" command from an administrator device via a cloud server. If the controller determines the "secure hide" command is validly signed, then the remote device executes the secure command by erasing the end user's decryption key from the remote device. At that point, end user access to the encrypted data on the remote device is highly improbable.

BRIEF DESCRIPTIONS OF THE DRAWINGS

Various embodiments are illustrated by way of example, and not by way of limitation, in the figures of the accompanying drawings, in which:

FIG. 6 is a conceptual diagram of an example data packet.

FIG. 7 is a flow chart of a method for recovering encrypted data that has been restricted on a remote device.

Figure 1:
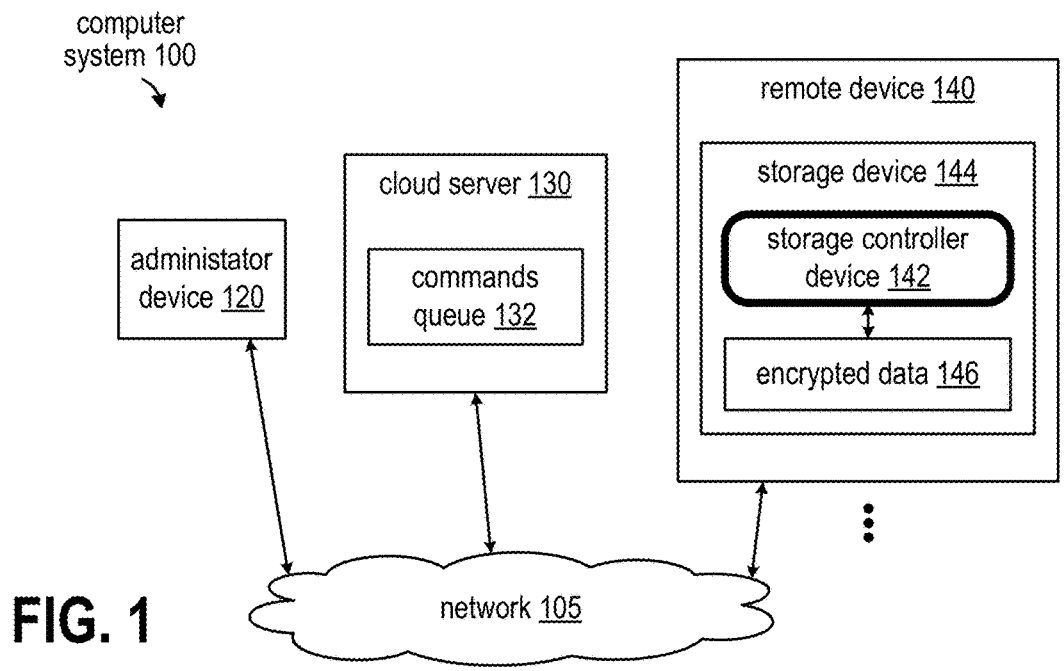
FIG. 1 is a block diagram of an example computer system for controlling encrypted data stored on a remote storage device.

It will be recognized that some or all of the Figures are for purposes of illustration and do not necessarily depict the actual relative sizes or locations of the elements shown. The Figures are provided for the purpose of illustrating one or more embodiments with the explicit understanding that they will not be used to limit the scope or the meaning of the claims.

DETAILED DESCRIPTION

In the following detailed description of the embodiments, numerous specific details are set forth. However, it will be obvious to one skilled in the art that the embodiments may be practiced without these specific details. In other instances well known methods, procedures, components, and circuits have not been described in detail so as not to unnecessarily obscure aspects of the embodiments.

A method, system, and apparatus are provided for controlling data stored on a remote device. As further described below, the system includes a cloud infrastructure (e.g., network) in which vital information may be stored on at least one remote device. A remote device is a computer device that is typically not within immediate physical possession of the administrator of the computer device. An administrator may include without limitation (1) a person who is responsible for the management of corporate remote devices and the security of encrypted data on the remote devices and/or (2) an owner of a remote device. The remote device is typically a remote computer device such as a laptop computer, a mobile phone, a tablet computer, or a desktop computer, for example, among other devices. The remote device may include a remote storage device, such as a network accessible storage (NAS) device or a portion of disk capacity (e.g., a logical unit number or address) of a cloud storage server. Vital information stored on the remote device may include, for example, emails, contacts, calendars, notes, and/or other information.

An administrator may need to cease access to encrypted data stored on the remote device. For example, a corporation may need to cease an employee's access to corporate data stored on the remote device immediately when the remote device is lost or stolen, for example. Accordingly, an IT staff member or IT manager desires to protect, without destroying, the data stored on the laptop that the employee possesses. As another example, the owner of a personal mobile device may desire to protect, without destroying, the data stored on their personal mobile phone when it is lost or stolen.

Some examples of where the present technology provides data protection are the following: (1) an end user of a corporate laptop has had his encryption key compromised; (2) an end user (e.g., disgruntled or terminated employee) has a status that has changed from being "authorized to access" encrypted data on a remote device to being "unauthorized to access" the encrypted data; and (3) a remote device (e.g., an end user's computer device) has been lost or stolen.

As further described below, the method remotely disables the ability of the user, or anyone with the user's encryption key, to access the secure data on the remote device. Such capability is provided by expanding the number of cryptographic keys stored on the remote device, adding new cryptographic transactions, and adding a "heartbeat" program that continuously communicates with a cloud server while the remote device is connected in any way to a cloud network (e.g., an Internet). In one implementation, a remote device includes a storage controller device that enables an entity to maintain ownership and/or control over encrypted data stored on the remote device.

System Overview

Referring now to FIG. 1, a block diagram of an example computer system 100 for controlling encrypted data 146 stored on a remote storage device 144 is shown. In the implementation of FIG. 1, the computer system 100 includes a network 105 that couples network devices, including an administrator device 120, a cloud server 130, and at least one remote device 140. The network 105 may include at least one of the following: an Internet Protocol (IP) network, a cellular network, a wireless network, a local area network (LAN), or a wide area network (WAN), among other network types.

Administrator device 120 may include a computer device that can receive administrator requests and send corresponding commands to remote device 140 via cloud server 130. For example, an IT manager, an IT staff, an owner, or another person may input requests at the administrator device 120.

Cloud server 130 includes, without limitation, a commands queue 132 (e.g., commands buffer, commands register, etc.). The cloud server can receive commands from administrator device 120, add the commands to commands queue 132, and send the commands to remote device 140 and/or other remote devices (not shown).

Remote device 140 may be implemented, for example, as a laptop computer, a mobile phone, a tablet computer, or a desktop computer, among other devices. In this example of FIG. 1, remote device 140 includes, without limitation, a storage device 144 having a storage controller device 142 and storing encrypted data 146. The remote device 140 can receive commands from cloud server 130 and execute the commands.

In one implementation, storage controller device 142 includes an application specific integrated circuit (ASIC) having microprocessors, memory blocks such as ROM, RAM, EEPROM, flash memory, and/or other building blocks. Storage controller device 142 can store encryption/decryption keys more securely than other media (e.g., optical hard disk drive). For example, an ASIC can store cryptographic keys in such a way that, if the storage controller device 142 undergoes tampering and/or the stored cryptographic keys are damaged, then the cryptographic keys are configured to be substantially inaccessible. Because the cryptographic keys on the storage controller device 142 are substantially inaccessible, the encrypted data 146 is also substantially inaccessible. Cryptographic keys are further discussed below with reference to FIG. 2.

Cryptographic Keys

The present technology uses a combination of asymmetric cryptography (e.g., public key system) for digital signature support and symmetric cryptography (e.g., conventional key system) for encrypting data. An asymmetric key pair (e.g., encryption/decryption key pair) includes two cryptographic keys that are related in such a way that the public key can be used to encrypt messages and only the corresponding private key can be used to decrypt the messages, or vice versa. Moreover, it is highly improbable that a person can deduce the private key from the corresponding public key. In contrast, a symmetric key can be used to perform both encryption and decryption.

Figure 2:
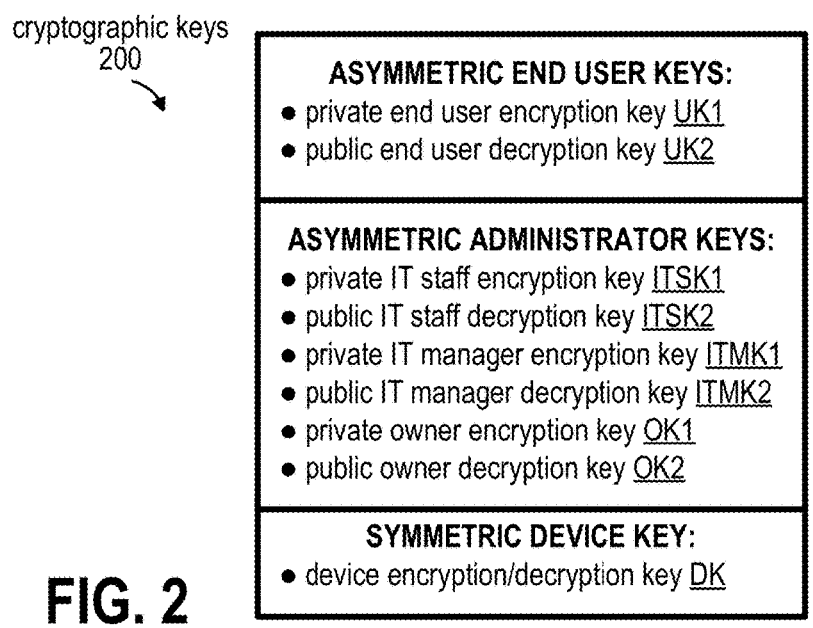
FIG. 2 is a table that shows example cryptographic keys that the computer system uses.

FIG. 2 is a table that shows example cryptographic keys 200 that the computer system 100 may use. The cryptographic keys 200 include asymmetric keys and a symmetric key. In this example, the asymmetric end user keys include a private end user encryption key UK1 and a public end user decryption key UK2. The asymmetric administrator keys include a private IT staff encryption key ITSK1, a public IT staff decryption key ITSK2, a private IT manager encryption key ITMK1, a public IT manager decryption key ITMK2, a private owner encryption key OK1, and a public owner decryption key OK2. The symmetric device key is a device encryption/decryption key DK.

Remote device 140 may securely store one or more of the following cryptographic keys 200 on the controller device 142 (e.g., ASIC): public end user decryption key UK2, public IT staff decryption key ITSK2, public IT manager decryption key ITMK2, public owner decryption key OK2, and/or device encryption/decryption key DK.

The other cryptographic keys 200 are private keys that are intended to be in possession of persons. For example, an end user of remote device 140 is in possession of private end user encryption key UK1. An IT staff member is in possession of private IT staff encryption key ITSK1. An IT manager is in possession of private IT manager encryption key ITMK1. An owner of a remote device is in possession of private owner encryption key OK1.

Saving Data to Remote Device

Figure 3:
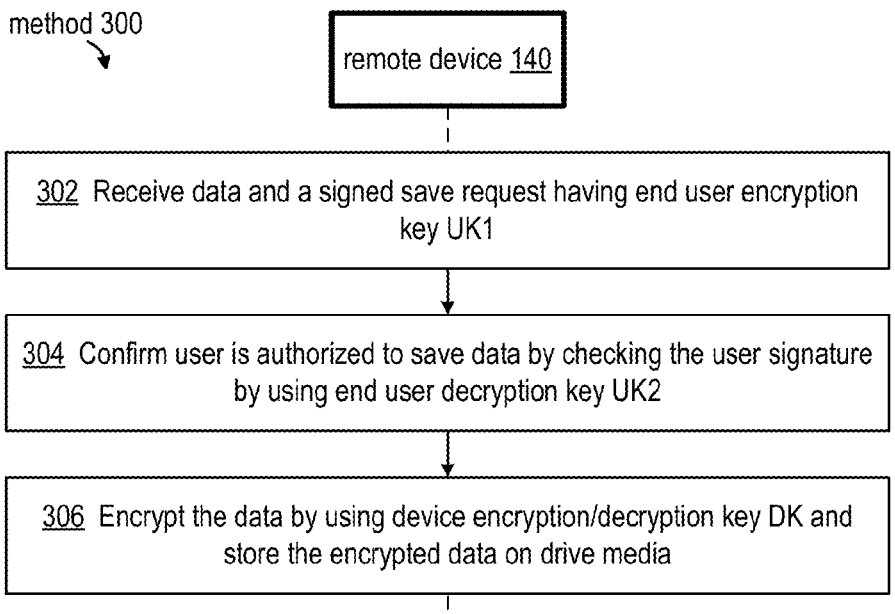
FIG. 3 is a flowchart for an example method for saving data on a remote device.

FIG. 3 is a flowchart for an example method 300 for saving data on remote device 140. In one implementation, storage controller device 142 of remote device 140 can carry out the method 300.

At process block 302, remote device 140 receives data that is to be saved and receives a signed save request. The save request is signed by using private user encryption key UK1.

At process block 304, storage controller device 142 confirms the user is authorized to save data by checking the user signature. Storage controller device 142 checks the user signature by using public user decryption key UK2.

Other actions, processes, and/or details are discussed with reference to the figures and may be a part of the method 300, depending on the implementation.

Retrieving Data from Remote Device

Figure 4:
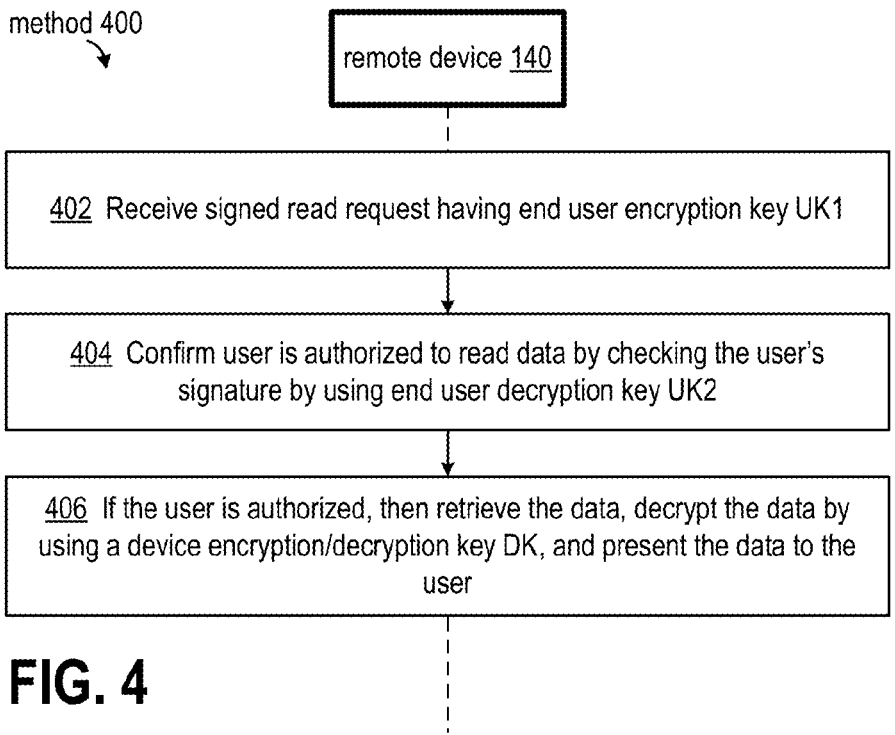
FIG. 4 is a flowchart for an example method 400 for retrieving data from a remote device.

FIG. 4 is a flowchart for an example method 400 for retrieving data from remote device 140. In one embodiment, storage controller device 142 of remote device 140 can carry out the method 400.

At process block 402, remote device 140 receives a signed read request having user private user encryption key UK1.

At process block 404, storage controller device 142 confirms the user is authorized to read data by checking the user's signature using public user decryption key UK2.

At process block 406, if the user is authorized, then the remote device 140 retrieves the encrypted data. The storage controller device 142 can then decrypt the data by using device encryption/decryption key DK. The remote device 140 presents the decrypted data to the user (e.g., presents the decrypted data via a display). However, if the user is unauthorized, then the remote device 140 does not retrieve the encrypted data.

Other actions, processes and/or details are discussed with reference to the figures and may be a part of the method 400, depending on the implementation.

Controlling Encrypted Data on Remote Device

It is often desirable for an entity (e.g., IT manager, IT staff, owner, or other person) to control encrypted data stored on the remote device 140. The present technology enables such control.

In one implementation, an administrator (e.g., corporate IT staff, corporate IT manager, owner, or other person) has enabled drive security by using the embedded encryption capability of the drives on the remote device 140. Accordingly, some cryptographic keys (e.g., UK2, ITSK2, ITMK2, OK2, and/or DK) may be securely stored on the remote device 140 (e.g., on the storage controller device 142).

Security may become compromised. For example, the private user encryption key UK1 may become compromised, or the status of the end user may change to being "unauthorized to access" encrypted data 146. Accordingly, it is desirable for the administrator to immediately restrict the holder of the user encryption key from having access to encrypted data 146, whether or not the end user and the remote device are present in a corporate office.

Figure 5:
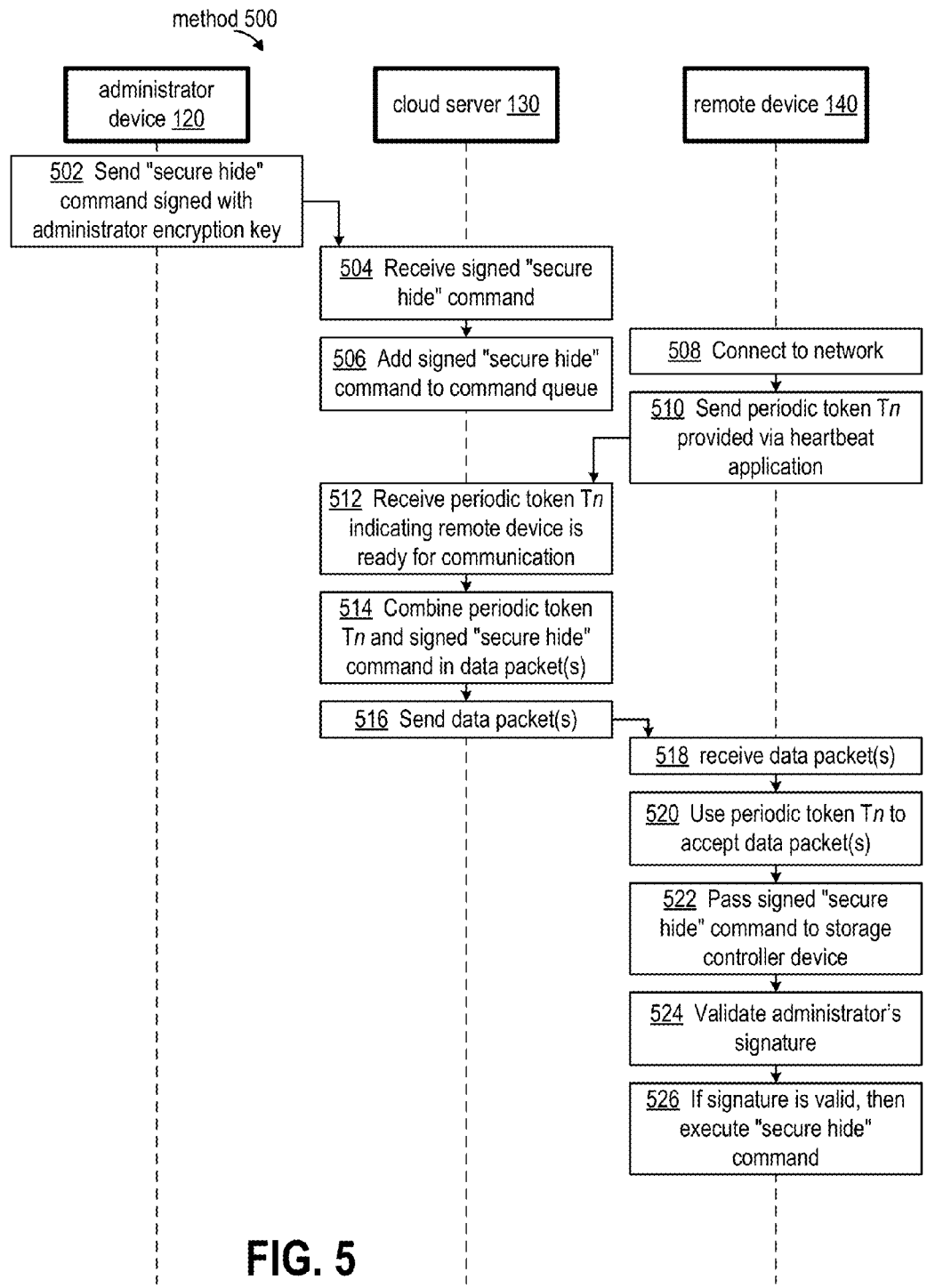
FIG. 5 is a flow chart of a method for controlling encrypted data on a remote device that may have compromised security.

FIG. 5 is a flow chart of a method 500 for controlling encrypted data on a remote device that may have undergone compromised security. In one implementation, the system 100 of FIG. 1 can carry out the method 500.

At process block 502, the IT administrator uses the administrator device 120 to send a signed "secure hide" command to remote device 140 via cloud server 130. The secure hide command is signed by using a private administrator encryption key (e.g., private IT staff encryption key ITSK1, private IT manager encryption key ITMK1, or private owner encryption key OK1). The signed "secure hide" command includes instruction for the remote device to perform a "secure hide" of the encrypted data on the remote device.

At process block 504, the cloud server 130 receives the signed "secure hide" command. At process block 506, the cloud server 130 adds the signed "secure hide" command to commands queue 132, which can include commands that are to be sent to one or more remote devices. If the cloud server 130 is not already connected with the remote device 140, then the cloud server remains available for a connection with the remote device 140.

At process block 508, the remote device 140 connects to network 105. For example, the end user turns on the power of a corporate laptop, which automatically connects to the Internet via a network adapter (e.g., a wireless network access card). In this implementation, the remote device 140 connects to the network 105 after the administrator device 120 sends the signed "secure hide" command to the cloud server 130. In another implementation (not shown), the remote device 140 is already connected to the network 105 before the administrator device 120 sends the signed "secure hide" command to the cloud server 130.

At process block 510, upon connecting to the network 105, the remote device 140 immediately sends a periodic token Tn to the cloud server 130, where n is a positive integer. For example, the remote device may send the periodic token Tn within one second after connecting to the Internet. In one implementation, the remote device 140 executes a "heartbeat" application, which is software and/or hardware that configures the remote device 140 to send a periodic token (e.g., T1, T2, T3, . . . , Tn) to the cloud server 130. Each periodic token Tn includes a digital message (e.g., query) that identifies the controller device 142 and/or the time at which the remote device sent the periodic token Tn. Each period of a periodic token Tn may have duration that is, for example, anywhere between one microsecond and several seconds. Accordingly, the periodic token Tn notifies the cloud server 130 that the remote device 140 is connected to the network, ready for communication, and/or ready to receive a command.

The heartbeat application is installed (e.g., by a corporation) on the remote device 140 before the remote device 140 is provided to the end user. The remote device initiates the heartbeat application, for example, in the form of an HTML port 80 query so that each periodic token Tn passes through routers, gateways, proxy servers, and other network devices as normal Internet traffic.

At process block 512, cloud server 130 receives periodic token Tn indicating the remote device 140 is ready for communication. At process block 514, cloud server 130 combines a periodic token Tn and the signed "secure hide" command in one or more data packets. An example data packet is described below with reference to FIG. 6. Referring to process block 516 of FIG. 5, the cloud server 130 sends the one or more data packets to the remote device 140. At process block 518, the remote device 140 receives one or more data packets, which include a secure hide command that may be signed with a private administrator encryption key.

Accordingly, when the cloud server 130 needs to send the signed "secure hide" command to remote device 140, the cloud server 130 sends the heartbeat query (e.g., periodic token Tn) with the signed "secure hide" command. Otherwise, if there is no signed "secure hide" command in command queue 132, then the heartbeat query returns with a no-op command, which instructs the remote device 140 to take no action with respect to hiding the encrypted data 146. If the laptop is not connected to the Internet longer than an allowed time-off period that is predetermined by the administrator (e.g., as determined by the cloud server 130 receiving a periodic token Tn), then an appropriate action will happen locally on the laptop. For example, the remote device 140 may proceed to restrict access locally, for example, before receiving a signed "secure hide" command from cloud server 130.

Alternatively, instead of a no-op command being returned to the remote device when a signed "secure hide" command is not in the commands queue 132, the cloud server 130 may return other status queries and/or maintenance commands to the remote device 140 via the heartbeat query. For example, a corporation can use these alternative status queries and maintenance commands to control and maintain corporate assets in the field, such as remote device 140.

At process block 520, the remote device reads periodic token Tn and accepts the one or more data packets based on the reading on the periodic token Tn. At process block 522, the remote device 140 passes the signed "secure hide" command to controller device 142 on the remote device 140.

At process block 524, the remote device 140 validates the administrator's signature. For example, the storage controller device 142 confirms the administrator is authorized to issue the signed "secure hide" command by checking the signature with one of the following public administrator decryption keys: public IT staff decryption key ITSK2, public IT manager decryption key ITMK2, or public owner decryption key OK2, as appropriate.

At process block 526, if the signature is valid, then storage controller device 142 executes the signed "secure hide" command. For example, storage controller device 142 revokes the end user's access to the encrypted data 146 by erasing (e.g., deleting or wiping) public end user decryption key UK2 from storage controller device 142. At that point, end user access to the encrypted data on the remote device 140 is high improbable. However, if the signature is invalid, then the storage controller device 142 does not execute the "secure hide" command.

Other actions, processes, and/or details are discussed with reference to the figures and may be a part of the method 500, depending on the implementation.

FIG. 6 is a conceptual diagram of an example data packet 600 that remote device 140 may receive. As discussed in process block 514 of FIG. 5, cloud server 130 combines a periodic token Tn and the signed "secure hide" command in one or more data packets. Data packet 600 is one example of such a data packet. As shown, data packet 600 includes a header 602, a periodic token Tn, and a signed "secure hide" command 604. In another implementation, the periodic token Tn may be included in the header 602.

Recovering Encrypted Data on Remote Device

At a later time after the encrypted data has been restricted as described above with reference to FIG. 5, it may be desirable for the administrator (e.g., IT staff, IT manager, or owner) to access the encrypted data on the remote device. For example, an administrator has recaptured possession of the remote device and can connect directly to the remote device.

FIG. 7 is a flow chart of a method or process 700 for recovering encrypted data that has been restricted on a remote data. In one implementation, the storage controller device 142 of remote device 140 can carry out the method 700.

At process block 702, the remote device 140 receives a "secure unhide" command that may be signed with a private administrator encryption key (e.g., private IT staff encryption key ITSK1, private IT manager encryption key ITMK1, or private owner encryption key OK1). Like the secure hide command, discussed with reference to FIG. 5, the secure unhide command that is signed with the private administrator encryption key may be referred to as a signed secure unhide command.

At process block 704, storage controller device 142 confirms the administrator is authorized to issue the "secure unhide" command. For the example, storage controller device 142 checks the validity of the administrator's signature by using a public user decryption key (e.g., public IT staff decryption key ITSK2, public IT manager decryption key ITMK2, or public owner decryption key OK2).

At process block 706, if the administrator is authorized, then storage controller device 142 executes the "secure unhide" command. For example, the storage controller device 142 (1) generates a new user encryption/decryption key pair UK1 and UK2 and (2) provides the new user encryption key UK1 to the remote device 140, which provides it to the administrator for distribution to the new end user. The new public user description key UK2 is stored within the storage controller device 142 for future use in confirming signatures on read/write requests. At this point, one may consider the remote device 140 to be back to normal operation. However, if the administrator is unauthorized, then storage controller device 142 does not execute the "secure unhide" command.

Other actions, processes and/or details are discussed with reference to the figures and may be a part of the method 700, depending on the implementation.

Computer Apparatus

Figure 8:
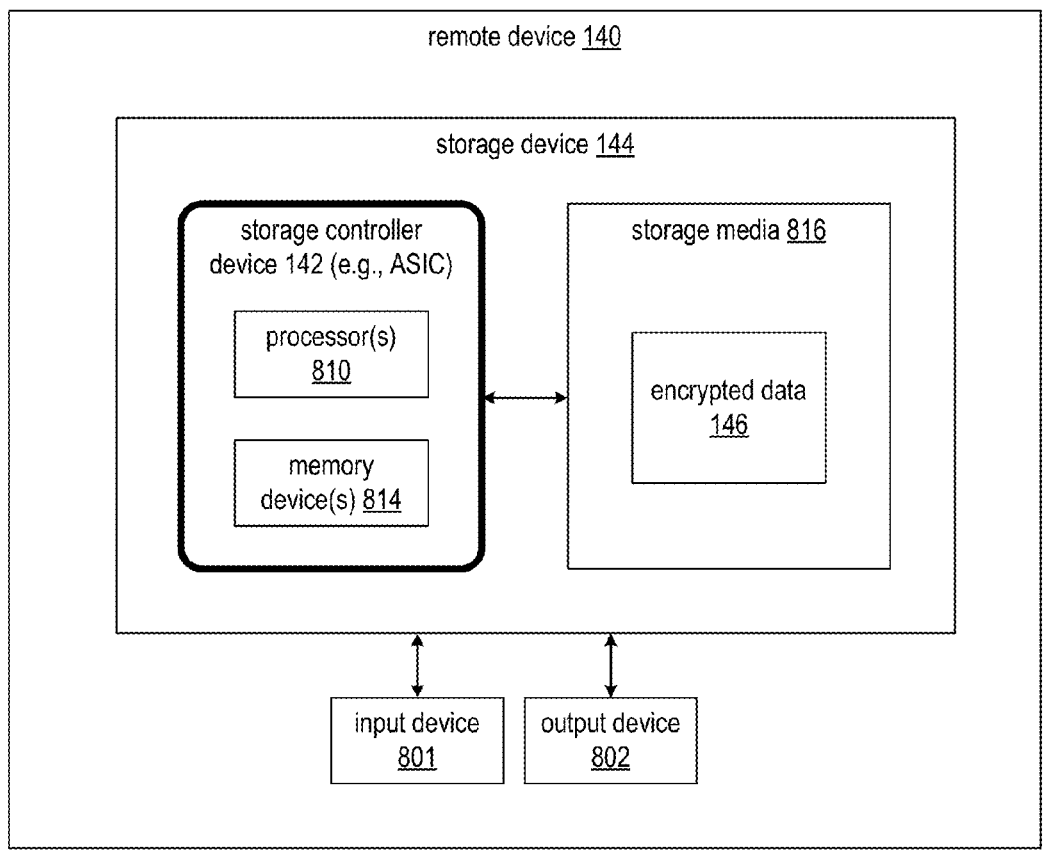
FIG. 8 is a block diagram showing a computer apparatus implementation of the remote device of FIG. 1.

FIG. 8 is a block diagram showing a computer apparatus implementation of the remote device 140 of FIG. 1. As described above with reference to FIG. 1, the remote device 140 may be implemented as a laptop computer, mobile phone, or a desktop computer, among other devices.

In the example of FIG. 8, the remote device 140 includes an input device 801 (e.g., keyboard, mouse, Ethernet or other communications port), an output device 802 (e.g., monitor, speakers, printer, communications port, or a writeable media drive), a storage device 144, which includes a storage controller device 142 and storage media 816 coupled together as shown. The storage controller device 142 may include one or more processors 810 and one or more memory devices 814 (e.g., ROM, RAM, EEPROM, flash memory and/or other memory building blocks). For example, the storage controller device 142 may include application integrated circuit (ASIC). The storage media 816 is configured to store encrypted data 146 on non-volatile memory such as a hard disk platter, a solid-state memory, and the like. In some embodiments, as is known in the art, the storage media may be located on another computing device across a network (e.g., network 105 of FIG. 1). Instructions may be loaded from the storage media into the memory device 814. The processor may retrieve instructions from the storage media or memory device(s) 814 and execute the instructions to perform the operations described herein.

In one embodiment, the storage controller device 142 is a limited function embedded cryptographic module. For example, the storage controller device 142 includes an ASIC that can perform all digital signature verifications and cryptographic key manipulations (required to perform secure hide and unhide commands) for the remote device 140. Note that any key use or manipulation performed outside of the ASIC is not safe. If keys are used or manipulated outside of the ASIC, then the keys are susceptible to attack by an unauthorized user due to the remote device reading memory and executable code outside of the ASIC. Accordingly, by having the memory device 814 inside the ASIC (storage controller device 142), the memory device 814 cannot be scanned. The memory device 814 is therefore a safe place to store and use the cryptographic keys.

Included in memory device(s) 814 or storage media 816 is a set of processor executable instructions that, when executed by the processor(s) 810 configure the computing apparatus to control the encrypted data 146 in a manner consistent with the methods disclosed herein. A user interface for controlling the encrypted data 146, shown in the Figures, may be displayed on the output device 802 or on a display device of administrator device 120 in response to processor or machine readable instructions.

The processor(s) 810 within the storage controller device 142 executes instructions stored in a non-transitory machine-readable memory or storage device, such as memory device(s) 814, the storage media 816, or a removable storage device (e.g., at least one of an optical medium, a compact disk (CD), a digital video disk (DVD), a magnetic medium, magnetic disk, or a magnetic tape, etc.), or solid state drive.

When implemented in software, the elements of the embodiments of the invention are essentially the program, code segments, or instructions to perform the necessary tasks. The program, code segments, or instructions can be stored in a processor readable medium or storage device that can be read and executed by a processor. The processor readable medium may include any medium that can store information. Examples of the processor readable medium include, without limitation, an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc. and stored in the processor readable medium or storage device.

Some portions of the preceding detailed description may have been presented in terms of algorithms and symbolic representations that perform operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities may take the form of electrical (e.g., current or voltage) or magnetic signals capable of being stored, transferred, combined, compared, and otherwise manipulated. It has proven convenient at times, principally for reasons of common usage, to refer to these signals as bits, values, levels, elements, symbols, characters, terms, numbers, or the like.

However, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, processing logic, or similar electronic computing device, that automatically or semi-automatically manipulates and transforms data represented as physical (electronic) quantities within the computer system's registers and memories into other data similarly represented as physical quantities within the computer system memories or registers or other such information storage, transmission or display devices.

Additionally, the embodiments of the invention are not described with reference to any particular programming language. It will be appreciated that a variety of programming languages may be used to implement the teachings of the embodiments of the invention as described herein.

CONCLUSION

A method, system, and apparatus to control encrypted data stored on a remote storage device are described. In particular, a remote device includes a storage controller device that can receive a "secure hide" command from an administrator device via a cloud server. If the storage controller device determines the "secure hide" command is validly signed, then the storage controller device executes the secure command by erasing the end user's public decryption key from the memory device embedded within the storage controller device. At that point, end user access to the encrypted data on the remote device is highly improbable.

It will be appreciated that the embodiments of the invention can be practiced by other means than that of the above-described embodiments, which are presented in this description for purposes of illustration and not of limitation. The specification and drawings are not intended to limit the exclusionary scope of this patent document. It is noted that various equivalents for the particular embodiments discussed in this description may be practiced by the claimed invention as well. That is, while specific embodiments of the invention have been described, it is evident that many alternatives, modifications, permutations and variations will become apparent in light of the foregoing description. Accordingly, it is intended that the claimed invention embrace all such alternatives, modifications and variations as fall within the scope of the appended claims. The fact that a product, process, or method exhibits differences from one or more of the above-described exemplary embodiments does not mean that the product or process is outside the scope (literal scope and/or other legally-recognized scope) of the following claims.

What is claimed is:

1. A storage controller device for controlling encrypted data stored on a storage device, the controller device comprising:

a processor to execute instructions; and
a memory device coupled to the processor, the memory device storing instructions for execution by the processor to cause the processor to perform:
receiving a data packet from a cloud server over a network, wherein the data packet includes a signed secure hide command;
validating the signed secure hide command by using a public administrator decryption key to confirm the signed secure hide command has been signed by using a private administrator encryption key;
if the signed secure hide command is validated, then executing the signed secure hide command by erasing a public user decryption key to revoke end user access to the encrypted data stored on the storage device;
receiving a signed secure unhide command;
validating the signed secure unhide command by using a public administrator decryption key to confirm the signed secure unhide command has been signed by using a private administrator encryption key; and
if the signed secure unhide command is validated, then executing the signed secure unhide command by generating a new user encryption/decryption key pair to grant new end user access to the encrypted data stored on the storage device, wherein the instructions further cause the processor to perform, before receiving the data packet:
executing a heartbeat application by sending a periodic token to the cloud server over the Internet, wherein receiving the data packet further comprises:
receiving the data packet from the cloud server, wherein the data packet further includes the periodic token that has been sent to the cloud server.

2. The storage controller device of claim 1, further comprising:
an application specific integrated circuit (ASIC), wherein the processor and the memory device are included on the application specific integrated circuit (ASIC).

3. The storage controller device of claim 1, wherein the periodic token identifies the controller device.

4. The storage controller device of claim 1, wherein:
an administrator device has signed the signed secure hide command by using the private administrator encryption key;
the administrator device is configured to send the signed secure hide command to a cloud server; and
the cloud server is configured to send the signed secure hide command to the storage controller device.

5. The storage controller device of claim 1, wherein the instructions further cause the processor to perform, before receiving the data packet:
connecting to a network; and
in less than five seconds after connecting to the network, sending a periodic token to a cloud server over the network.

6. The storage controller device of claim 1 wherein executing the signed secure unhide command further comprises:
storing the new user encryption/decryption key pair on the memory device.

7. A method for controlling encrypted data stored on a storage device, the method comprising:
receiving a data packet from a cloud server over a network, wherein the data packet includes a signed secure hide command;

validating the signed secure hide command by using a public administrator decryption key to confirm the signed secure hide command has been signed by using a private administrator encryption key;
if the signed secure hide command is validated, then executing the signed secure hide command by erasing a public user decryption key to revoke end user access to the encrypted data stored on the storage device;
receiving a signed secure unhide command;
validating the signed secure unhide command by using a public administrator decryption key to confirm the signed secure unhide command has been signed by using a private administrator encryption key; and
if the signed secure unhide command is validated, then executing the signed secure unhide command by generating a new user encryption/decryption key pair to grant new end user access to the encrypted data stored on the storage device,
wherein one or more of the receiving, validating, and executing are performed with a processor, further comprising, before receiving the data packet:
executing a heartbeat application by sending a periodic token to the cloud server over the Internet, wherein receiving the data packet further comprises:
receiving the data packet from the cloud server, wherein the data packet further includes the periodic token that has been sent to the cloud server.

8. The storage controller device of claim 2, wherein:
the public administrator decryption key is stored on the memory device, and wherein the public administrator decryption key is configured to be substantially inaccessible if the storage controller device undergoes tampering.

9. The method of claim 7, wherein executing the signed secure unhide command further comprises:
storing the new user encryption/decryption key pair on the memory device.

10. The method of claim 7, wherein the periodic token identifies the storage controller device.

11. The method of claim 7, wherein:
an administrator device has signed the signed secure hide command by using the private administrator encryption key;
the administrator device is configured to send the signed secure hide command to a cloud server; and
the cloud server is configured to send the signed secure hide command to a storage controller device that is configured to receive the data packet.

12. The method of claim 7, further comprising, before receiving the data packet:
connecting to a network; and
in less than five seconds after connecting to the network, sending a periodic token to a cloud server over the network.

13. A computer-readable product for controlling encrypted data stored on a storage device, the computer-readable product including a non-transitory computer-readable storage medium storing instructions that when executed perform the functions comprising:
receiving a data packet from a cloud server over a network, wherein the data packet includes a signed secure hide command;
validating the signed secure hide command by using a public administrator decryption key to confirm the signed secure hide command has been signed by using a private administrator encryption key;
if the signed secure hide command is validated, then executing the signed secure hide command by erasing a public user decryption key to revoke end user access to the encrypted data stored on the storage device;
receiving a signed secure unhide command;
validating the signed secure unhide command by using a public administrator decryption key to confirm the signed secure unhide command has been signed by using a private administrator encryption key; and
if the signed secure unhide command is validated, then executing the signed secure unhide command by generating a new user encryption/decryption key pair to grant new end user access to the encrypted data stored on the storage device, wherein the instructions further cause the processor to perform, before receiving the data packet:
executing a heartbeat application by sending a periodic token to the cloud server over the Internet, wherein receiving the data packet further comprises:
receiving the data packet from the cloud server, wherein the data packet further includes the periodic token that has been sent to the cloud server.

* * * * *